US010843217B2

(12) United States Patent
Moreno Aparicio et al.

(10) Patent No.: US 10,843,217 B2
(45) Date of Patent: Nov. 24, 2020

(54) PUMP OVERTUBES AND METHODS OF MAKING THE SAME

(71) Applicant: WESTROCK DISPENSING SYSTEMS R&D NETHERLANDS B.V., Waalwijk (NL)

(72) Inventors: Alberto A. Moreno Aparicio, Drunen (NL); Oscar Faneca Llesera, Barcelona (ES)

(73) Assignee: Silgan Dispensing Systems Netherlands B.V., Waalwijk (NL)

( * ) Notice: Subject to any disclaimer, the term of this patent is extended or adjusted under 35 U.S.C. 154(b) by 0 days.

(21) Appl. No.: 15/766,888

(22) PCT Filed: Oct. 13, 2016

(86) PCT No.: PCT/EP2016/074628
§ 371 (c)(1),
(2) Date: Apr. 9, 2018

(87) PCT Pub. No.: WO2017/064208
PCT Pub. Date: Apr. 20, 2017

(65) Prior Publication Data
US 2018/0290169 A1    Oct. 11, 2018

Related U.S. Application Data

(60) Provisional application No. 62/240,788, filed on Oct. 13, 2015.

(51) Int. Cl.
*B05B 11/00* (2006.01)
*B05B 15/37* (2018.01)
*B65B 3/32* (2006.01)
*G01F 11/02* (2006.01)
*A47K 5/12* (2006.01)

(52) U.S. Cl.
CPC ............ *B05B 15/37* (2018.02); *B65B 3/32* (2013.01); *G01F 11/023* (2013.01); *G01F 11/024* (2013.01); *G01F 11/025* (2013.01); *G01F 11/029* (2013.01); *A47K 5/1201* (2013.01); *A47K 5/1202* (2013.01);
(Continued)

(58) Field of Classification Search
CPC ............ B05B 11/3049; B05B 11/3042; B05B 11/3047; B05B 15/37; B05B 15/30; B65D 83/32
USPC ............................ 222/321.9, 382, 321.7, 78
See application file for complete search history.

(56) References Cited

U.S. PATENT DOCUMENTS 2,859,899 A * 11/1958 Kramer ............... B67D 7/0205
222/95
3,658,215 A * 4/1972 Ewald .................... B65D 83/32
222/402.18
(Continued)

FOREIGN PATENT DOCUMENTS

EP      2457667 A1    5/2012
WO    2007028890 A2   3/2007
WO    2014108641 A1   7/2014

*Primary Examiner* — Charles Cheyney
(74) *Attorney, Agent, or Firm* — Barlow, Josephs & Holmes, Ltd.

(57) ABSTRACT

A pump system (100) including an overtube adapter (140) and an overtube (150) attached to the overtube adapter (140), the overtube (150) capable of being selectively attached to the overtube adapter (140) to provide different overtube (150) aesthetics for pump systems and fragrance products.

9 Claims, 6 Drawing Sheets

SECTION E-E

(52) U.S. Cl.
CPC ..... *B05B 11/00416* (2018.08); *B05B 11/3049* (2013.01); *B05B 11/3074* (2013.01)

(56) References Cited

U.S. PATENT DOCUMENTS

| | | | | |
|---|---|---|---|---|
| 4,801,049 A | * | 1/1989 | Thompson | B05B 11/0027 222/179.5 |
| 5,156,300 A | * | 10/1992 | Spahni | B05B 11/048 222/105 |
| 5,529,216 A | * | 6/1996 | Klima | B05B 11/0056 222/130 |
| 6,065,640 A | * | 5/2000 | Ho | B05B 11/0005 222/78 |
| 6,119,897 A | * | 9/2000 | Boileau | B05B 11/3042 222/78 |
| 6,250,511 B1 | * | 6/2001 | Kelly | B01F 1/0022 15/104.93 |
| 6,276,566 B1 | * | 8/2001 | Zaksenberg | A45D 34/00 222/78 |
| 6,334,449 B1 | * | 1/2002 | Burrowes | B65D 81/3211 132/112 |
| 6,505,986 B1 | * | 1/2003 | Oder | A45D 19/02 222/211 |
| 6,601,739 B2 | * | 8/2003 | Lacout | G01F 11/025 222/321.5 |
| 7,055,941 B2 | * | 6/2006 | Tsurui | B41J 2/175 222/211 |
| 7,578,418 B2 | | 8/2009 | Milian | |
| 8,978,932 B2 | * | 3/2015 | Choquart | B05B 11/3042 222/321.9 |
| 9,856,071 B2 | * | 1/2018 | Yamaguchi | B65D 83/38 |
| 10,022,738 B2 | * | 7/2018 | Pouliaude | B05B 15/37 |
| 2005/0133544 A1 | | 6/2005 | Tadlock et al. | |
| 2012/0104049 A1 | | 5/2012 | Choquart et al. | |

\* cited by examiner

SECTION E-E

SECTION E-E

SECTION E-E

PUMP OVERTUBES AND METHODS OF MAKING THE SAME

BACKGROUND OF THE INVENTION

Field of the Invention

Embodiments of the invention relate to overtubes for use with pump and more particularly, to the manufacture of overtubes and the assembly of overtubes to pump systems for use in fragrance and other products.

State of the Art

Pump systems are traditionally used with fragrance products to deliver a fine spray of fragrance to a desired location. For example, pump systems are used to disperse and apply perfume to a user or an object. Many such pump systems include a pump engine, a connection device to connect the pump engine to a bottle or container, a spray head used to actuate the pump engine and disperse liquid, and a dip-tube used to transport a product in the bottle or container to the pump engine. Such pump systems are well known and can be used with perfumes or other products.

Beauty and design are often key components of a package. Different designs and methods for making a package or pump system look less like a pump system and more like an artistic piece are often desired. For example, U.S. Pat. No. 6,729,500 discloses a pump dispenser having a twirling dip tube to which one or more figurines may be attached such that actuation of the pump moves the figurines. In another example—U.S. Pat. No. 7,578,418—a fragrance dispenser is disclosed having covering tube or an overtube covering the dip tube.

While overtubes have been used with pump systems and to decorate a fragrance package, there is a need to improve the way such overtubes may be incorporated with or attached to the pump system. In addition, because such overtubes are often molded from a resin or plastic, it is desirable to have a method by which different overtube designs may be readily changed using the same mold bodies.

BRIEF SUMMARY OF THE INVENTION

According to various embodiments of the invention, a pump system may include a pump engine attached to a bottle by an attachment system and fitted with an actuation system. An overtube adapter may be positioned between the pump engine and the bottle, retaining at least a portion of the overtube adapter within the bottle, and in some embodiments in a bottle neck area. An overtube according to various embodiments of the invention may be attached to the overtube adapter. The overtube may extend downward into the bottle away from an opening in the bottle or away from the pump engine.

According to various embodiments of the invention, an overtube adapter may include one or more seals or ridges to retain an overtube on the overtube adapter. In still other embodiments, an overtube adapter may include other features—such as bumps, snap features, o-rings, or ledges—to retain an overtube to the overtube adapter.

According to some embodiments of the invention, an overtube is a molded plastic component. In some embodiments of the invention, the overtube is substantially cylindrical and includes voids, openings, or spaces created by at least two slides in a mold. In such embodiments, an overtube includes at least two continuous portions running from one end of the overtube to the other end along a straight line perpendicular to a plane bisecting the overtube through the middle of the tube. In other embodiments of the invention, the overtube is substantially cylindrical and includes voids, openings, or spaces created by at least four slides in a mold. In such embodiments, an overtube includes at least four continuous portions running from one end of the overtube to the other end along a straight line perpendicular to a plane bisecting the overtube through the middle of the tube.

In still other embodiments of the invention, an overtube need not be substantially cylindrical. An overtube may be any desired shape so long as it is configured to fit through an opening in a bottle and attached to an overtube adapter.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

According to various embodiments of the invention, a pump system may include an overtube adapter and an overtube connected to the overtube adapter. The overtube adapter may be positioned between a pump engine and a bottle and by support an overtube inserted in the bottle. The pump system may be attached to a bottle or container as part of a fragrance product.

Figure 1:
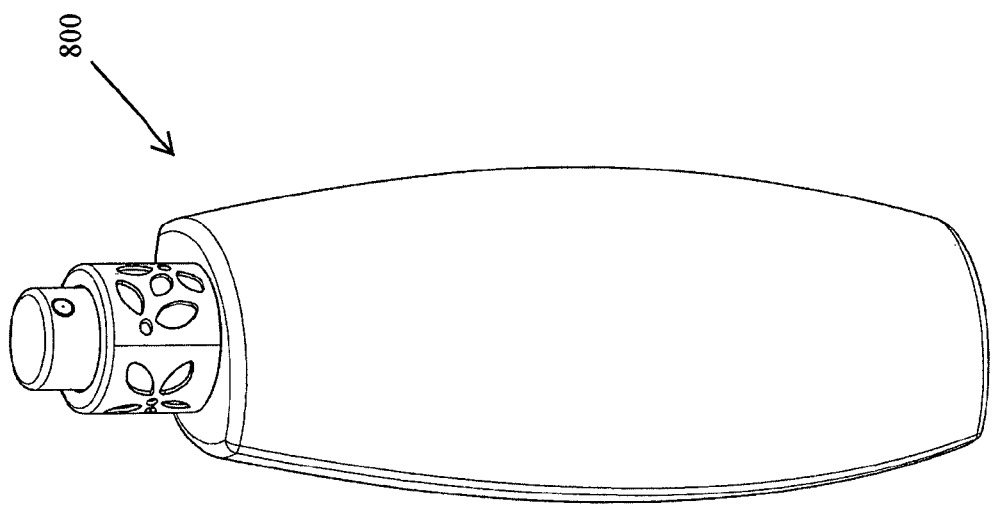
FIG. 1 illustrates a fragrance product according to various embodiments of the invention.

A fragrance product 800 according to various embodiments of the invention is illustrated in FIG. 1. As illustrated, the fragrance product 800 may include a bottle 900 and a pump system 100 mounted on or attached to the bottle 900. The pump system 100 may be configured to pump a product from an interior space of the bottle 900 for delivery as a spray or jet by the pump system 100.

Figure 2:
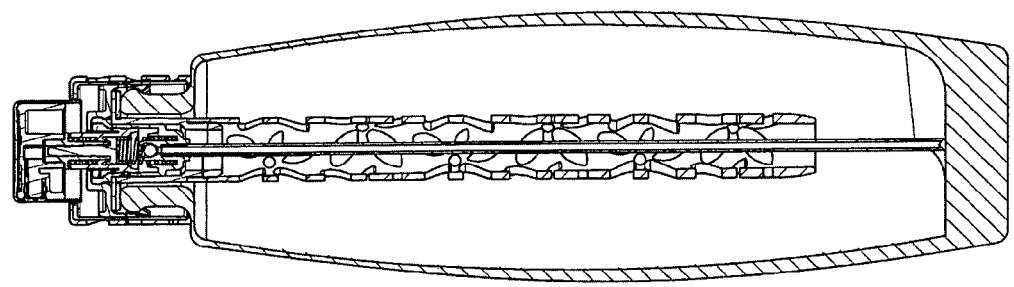
FIG. 2 illustrates a cross-sectional view of a fragrance product and pump system according to various embodiments of the invention.
Figures 3, 4:
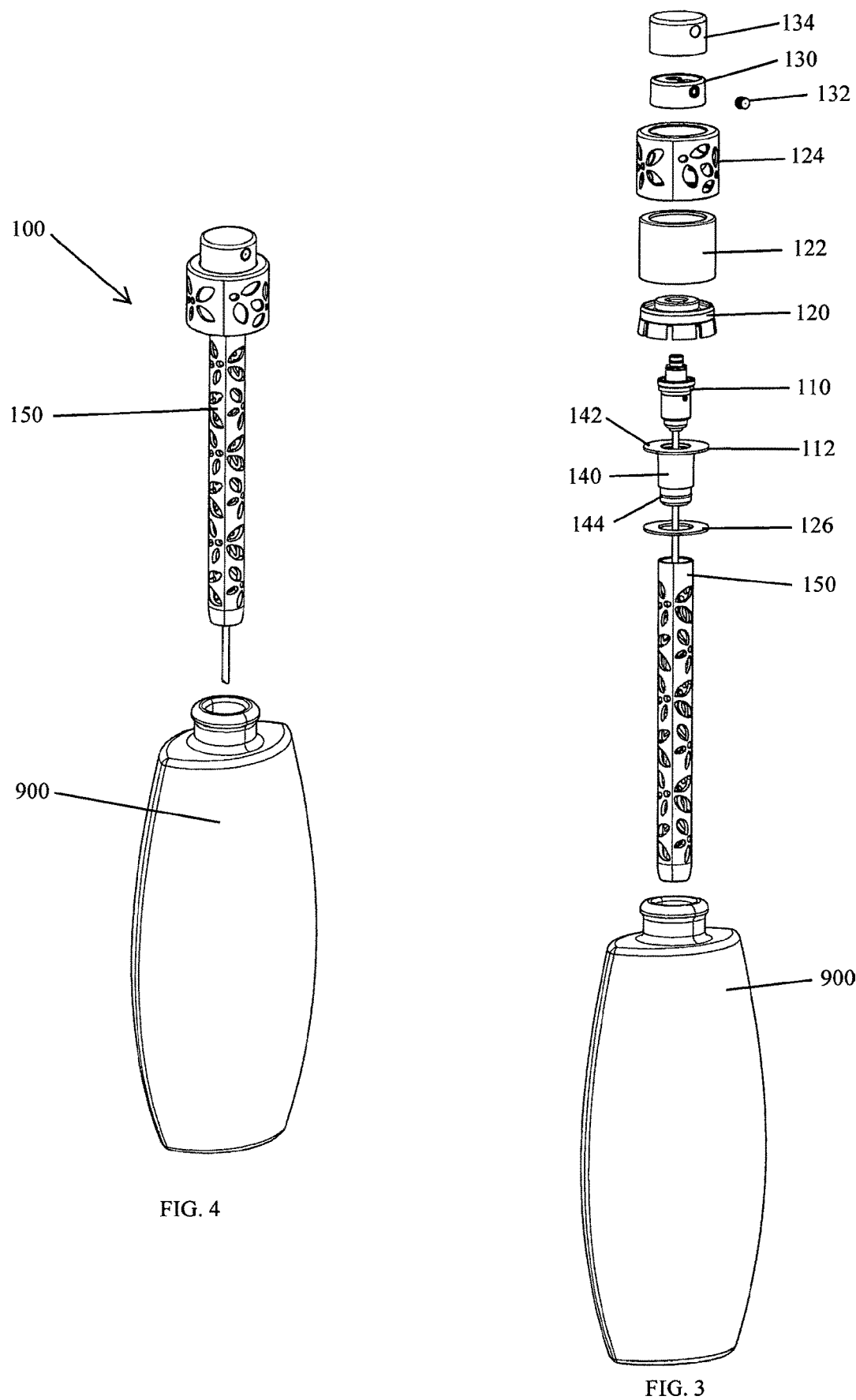
FIG. 3 illustrates a component view of a fragrance product and pump system according to various embodiments of the invention.
FIG. 4 illustrates a pump system being assembled to a bottle according to various embodiments of the invention.
Figure 5:
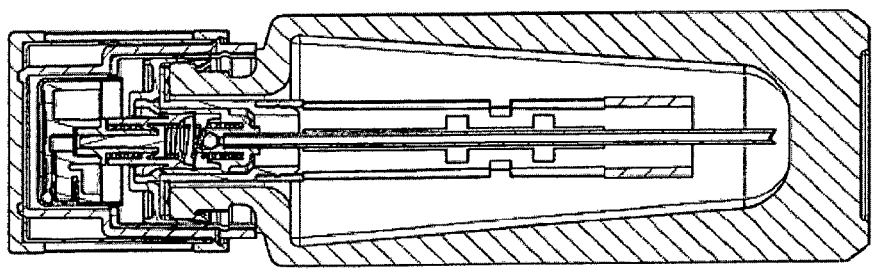
FIG. 5 illustrates a cross-sectional view of a fragrance product and pump system according to various embodiments of the invention.
Figure 8:
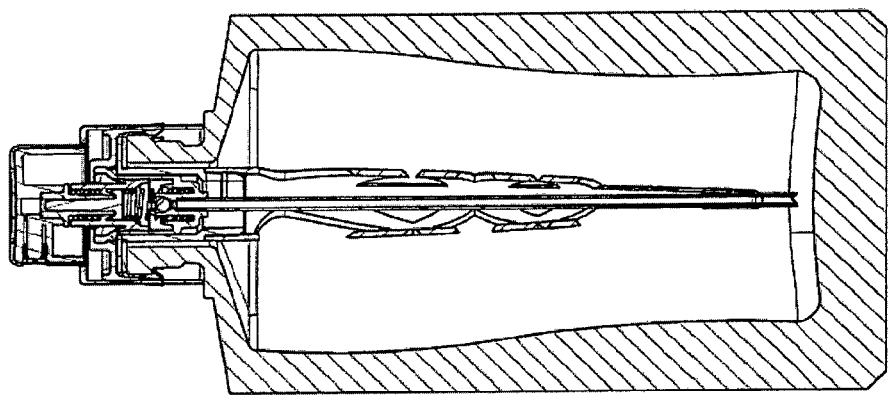
FIG. 8 illustrates a cross-sectional view of a fragrance product and pump system according to various embodiments of the invention.
Figure 11:
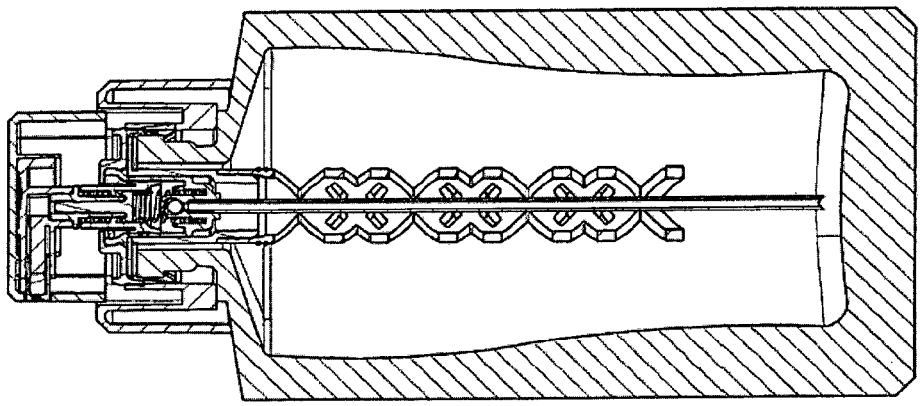
FIG. 11 illustrates a cross-sectional view of a fragrance product and pump system according to various embodiments of the invention.
Figures 6, 7:
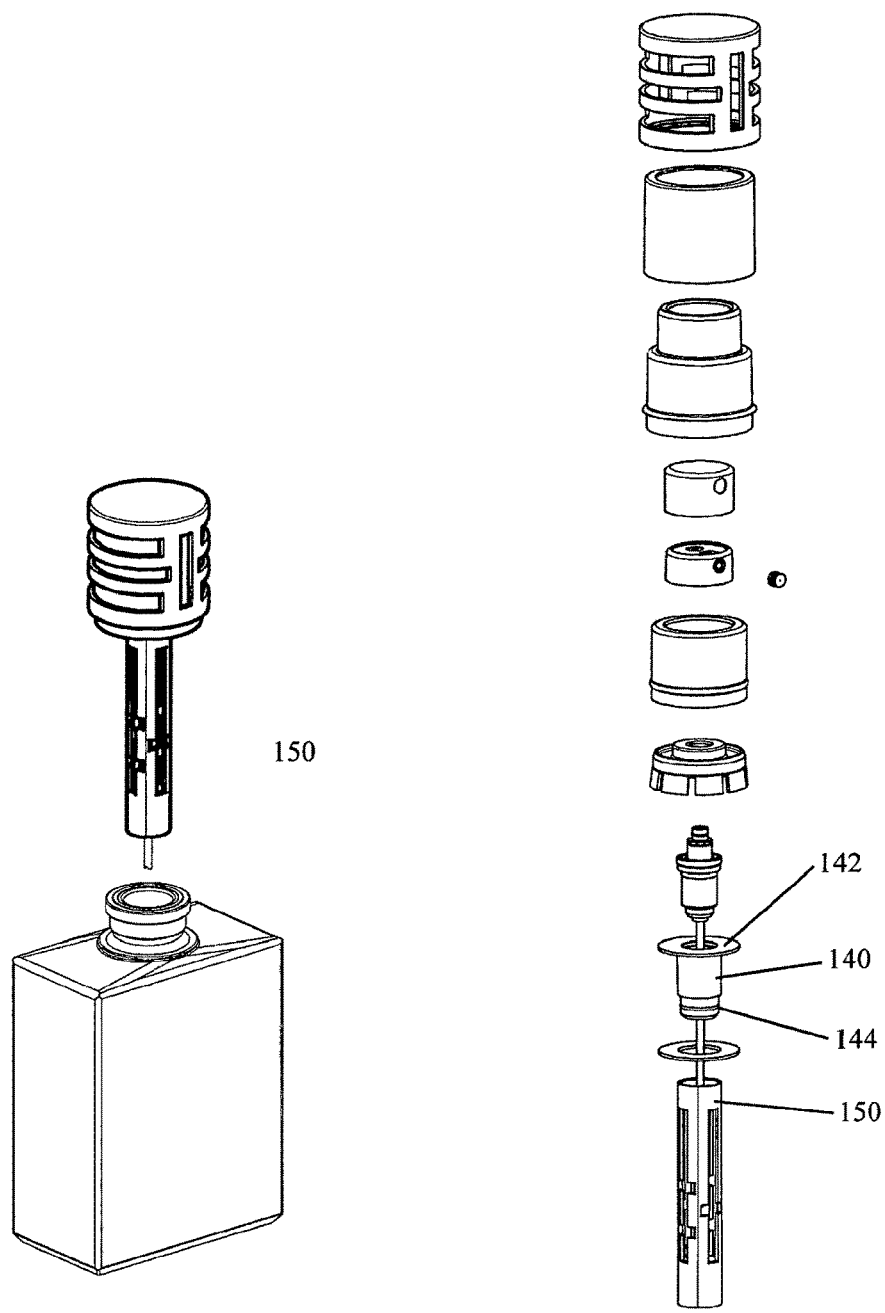
FIG. 6 illustrates a pump system being assembled to a bottle according to various embodiments of the invention.
FIG. 7 illustrates a component view of a fragrance product and pump system according to various embodiments of the invention.
Figure 9:
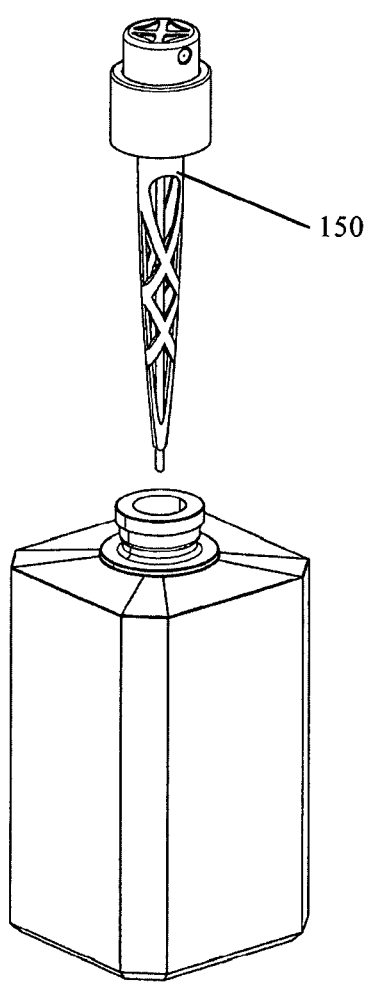
FIG. 9 illustrates a pump system being assembled to a bottle according to various embodiments of the invention.
Figure 10:
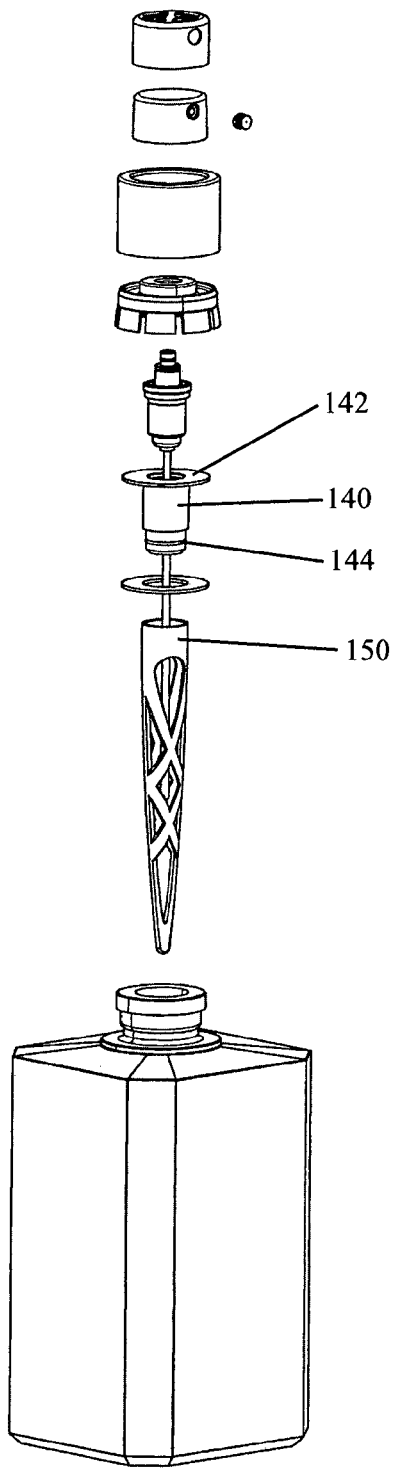
FIG. 10 illustrates a component view of a fragrance product and pump system according to various embodiments of the invention.
Figure 12:
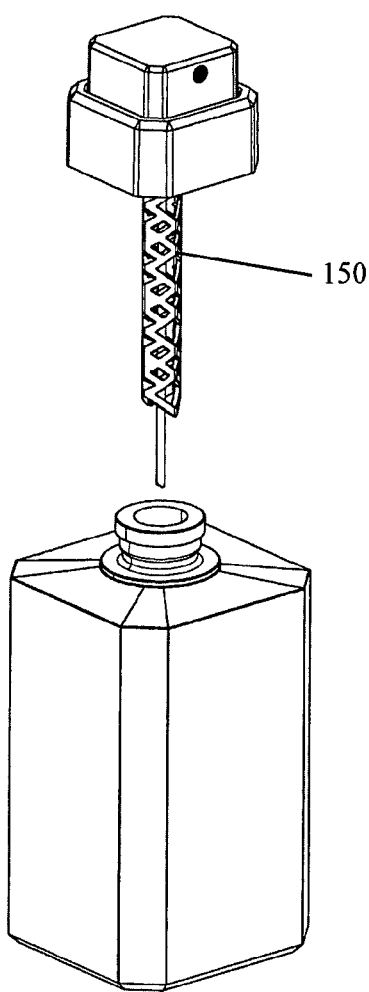
FIG. 12 illustrates a pump system being assembled to a bottle according to various embodiments of the invention.
Figure 13:
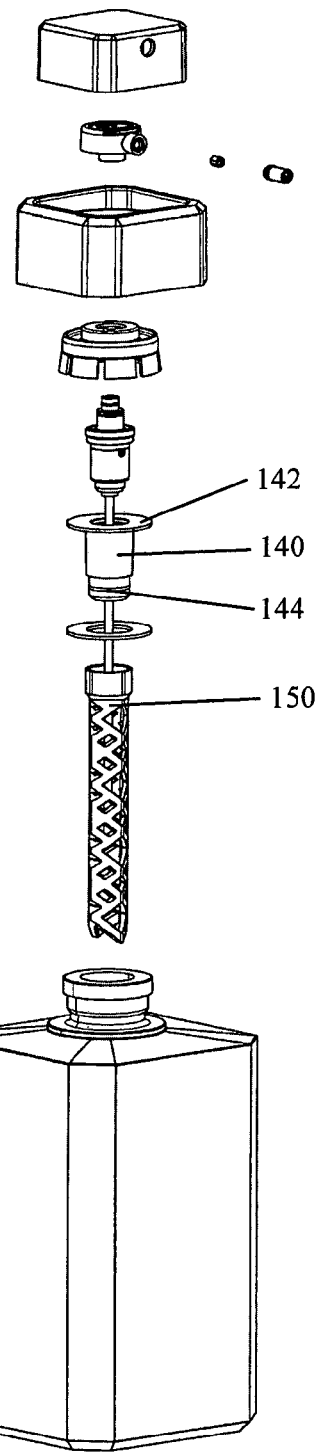
FIG. 13 illustrates a component view of a fragrance product and pump system according to various embodiments of the invention.

As illustrated in FIGS. 2 and 3, a pump system 100 may include a pump engine 110, a dip tube 112 retained by the pump engine 110, a snap-collar 120, a collet 122, and a decorative collar 124. An actuator 130 may be attached or in fluid communication with the pump engine 110 and an orifice cup 132 may be inserted in a portion of the actuator 130 through which liquid or product passes before being expelled from the pump system 100. An actuator cap 134 may cover the actuator 130 or at least a portion thereof. An overtube adapter 140 may be positioned such that the pump engine 110 may fit within an interior space of the overtube adapter 140 and an overtube 150 may be attached to the overtube adapter 140. In some embodiments, a gasket 126 may be positioned between the bottle 900 and a flange 142 of of the overtube adapter 140.

Various embodiments of the invention may utilize components of the pump system 100 that are similar to pump systems that are in the market today. For example, the pump engine 110, dip tube 112, snap-collar 120, collet 122, decorative collar 124, actuator 130, orifice cup 132, and actuator cap 134 are all used in conventional fragrance products and other pump systems. However, embodiments of the invention also include an overtube adapter 140 and overtube 150 as illustrated.

According to certain embodiments of the invention, an overtube adapter 140 may be a molded part. The overtube adapter 140 may have a substantially tube-like shape or body and may be configured to accept a pump engine 110 within an interior portion of the overtube adapter 140. The overtube adapter 140 may also include one or more flanges 142 extending out from the body of the overtube adapter 140 adjacent to, or at an end of, the overtube adapter 140. The one or more flanges 142 may be configured to rest on the rim of a bottle opening or the top of a bottle neck finish. The one or more flanges 140 may help support the pump system 100 when mounted on a bottle 900. As illustrated in FIG. 3, a gasket 126 may be positioned between the overtube adapter 140 and an opening in the bottle 900.

An overtube adapter 140 according to various embodiments of the invention may also include one or more overtube attachment features 144. As illustrated in FIG. 3, an overtube attachment feature 144 may include a raised rib about a circumference of an outer surface of the overtube adapter 140. The raised rib may be configured to snap-fit with a depression or channel on an interior of an overtube 150 surface such that the overtube 150 may snap-fit with the overtube adapter 140.

While various embodiments of the invention are shown and described with the overtube adapter 140 having an overtube attachment feature 144 on an exterior surface thereof and a corresponding, mating portion on an interior surface of an overtube 150, it is understood that the configuration could be reversed. In other words, an overtube attachment feature 144 could be on an outer surface of an overtube 150 and the overtube 150 could snap into the overtube adapter 140. Furthermore, the features used to attach an overtube 150 to an overtube adapter 140 could be interchanged between the overtube 150 and the overtube adapter 140 such that a ridge or channel could be used on either component as desired to create a mating condition between the two components.

According to still other embodiments of the invention, multiple overtube attachment features 144 may be incorporated with an overtube adapter 140 and overtube 150 to retain the components in a joined condition. In still other embodiments, the overtube adapter 140 and overtube 150 could be manufactured as a singular structure or component, however, such embodiments would not have all the advantages of using separate components as in other embodiments of the invention.

The use of an overtube adapter 140 with an overtube 150 according to various embodiments of the invention offers many improvements and advantages over existing overtube structures and devices. First, the use of the overtube adapter 140 allows a user to select the overtube 150 to be used with a pump system 100 such that different overtubes 150 may be made for different products or for different customers. While a single structure comprising both the overtube adapter portion and overtube could be used, by breaking the overtube adapter 140 and overtube 150 into two components, it is cheaper and quicker to change the design and configuration of the pump system 100. For example, according to certain embodiments of the invention a first mold may be purchased to make the overtube adapter 140. A second mold—and subsequent molds—may be purchased to make all of the different overtube 150 designs desired. If a new overtube 150 design is desired, only a new overtube 150 mold is required. In addition, an overtube 150 mold may include replaceable slides or slides that may be changed to create new aesthetics in the overtube 150. In this manner, the changeover costs required to change the aesthetic look of the overtube 150 are reduced because only parts of a mold need be changed rather than new molds ordered for each desired aesthetic design.

According to various embodiments of the invention, an overtube 150 may be a molded structure. In some embodiments, a molded overtube 150 may be made with a mold cavity having two operable slides such that the slides may be operated to create the openings or spaces in the overtube 150. In other embodiments, a molded overtube 150 may be made within a mold cavity having four operable slides such that the slides may be operated to create the openings or spaces in the overtube 150.

In some embodiments of the invention, an overtube 150 includes two continuous material portions extending from one end of the overtube 150 to the other end of the overtube 150. The continuous material portions run along a straight line or through a single plane. For example, when an overtube 150 is molded in a mold cavity having two slides used to create the decorations in the overtube 150, two linear portions of the overtube 150 from end to end will be continuous without any interruptions, spaces, or openings. In some embodiments, the two continuous material portions may be on opposite sides of the overtube 150 or 180 degrees apart.

In other embodiments of the invention, an overtube 150 includes four continuous material portions extending from one end of the overtube 150 to the other end of the overtube 150. The continuous material portions run along a straight line or through a single plane. For example, when an overtube 150 is molded in a mold cavity having four slides used to create the decorations in the overtube 150, two linear portions of the overtube 150 from end to end will be continuous without any interruptions, spaces, or openings.

In some embodiments, the four continuous material portions may be at 90 degrees from each other.

According to various embodiments of the invention, a pump system 100 may be molded and assembled as illustrated in FIG. 4. Once assembled, the pump system 100 may be shipped to a filling location where bottles 900 are filled and the pump system 100 is attached to the bottle 900 along the filling line.

Other embodiments and designs according to various embodiments of the invention are illustrated in FIGS. 5 through 13.

While various embodiments of the invention are described herein, it is understood that the particular embodiments are not to be limited by particular details set forth in the description, as many apparent variations thereof are contemplated. Rather, embodiments of the invention may include within their scope all equivalent devices or methods which operate according to the principles of the embodiments of the invention described.

What is claimed is:

1. A fragrance product dispensing system, comprising:
    a bottle having a body portion and a neck portion and containing a volatile fragrance liquid; and
    a fine mist spray pump system attached to the neck portion of the bottle, the fine mist spray pump system comprising
        a dip tube,
        an overtube adapter, the overtube adapter having a cylindrical body and a flange extending outward from an end of the overtube adapter,
        an overtube attached to the overtube adapter, the overtube comprising,
            a first end;
            a second end;
            a tubular wall between the first end and the second end, wherein the first end is received around the cylindrical body of the overtube adapter within the neck portion of the bottle creating a closed first end around the dip tube, and the second end is free floating relative to the dip tube creating an open second end, said cylindrical body of said overtube adapter and the first end of the overtube being received within the neck portion of the body with the flange of the overtube adapter seated on the neck;
            decorations in the overtube consisting of a plurality of ornamental openings through the tubular wall which cooperate to form decorative shapes, said open second end and said plurality of ornamental openings allowing a free flow of said volatile fragrance liquid into and out of said overtube, said overtube and said decorative openings being visible within said bottle;
            a first continuous portion beginning at the first end and extending to the second end bisecting no decorations; and
            a second continuous portion beginning at the first end and extending to the second end bisecting no decorations; and
        a decorative collar disposed around a first end of the dip tube, the neck portion of the bottle, the overtube adapter, and the first end of the overtube, wherein the decorative collar includes decorations consisting of a plurality of additional openings which cooperate to form a second set of decorative shapes.

2. The fragrance product dispensing system of claim 1, wherein the overtube adapter comprises an overtube attachment feature adjacent one end of the overtube adapter.

3. The fragrance product dispensing system of claim 1, wherein the overtube adapter comprises at least one rib adjacent one end of the overtube adapter and the overtube comprises at least one channel configured to mate with the at least one rib to retain the overtube on the overtube adapter.

4. An improved fragrance product dispensing system having a fine mist spray pump engine with a dip tube, an actuator attached to the fine mist spray pump engine and in fluid communication therewith, an attachment collar for attaching the fine mist spray pump engine to a clear bottle having a neck and containing a volatile fragrance liquid, the improvement comprising:
    an overtube adapter positioned between the fine mist spray pump engine and the neck portion of the bottle, the overtube adapter having a cylindrical body and a flange extending outward from an end of the overtube adapter;
    an overtube attached to the overtube adapter and extending into the bottle and substantially surrounding the dip tube, the overtube comprising,
        a first end;
        a second end;
        a tubular wall between the first end and the second end, wherein the first end is received around the cylindrical body of the overtube adapter within the neck portion of the bottle creating a closed first end around the dip tube, and the second end is free floating relative to the dip tube creating an open second end, said cylindrical body of said overtube adapter and the first end of the overtube being received within the neck portion of the body with the flange of the overtube adapter seated on the neck;
        decorations in the overtube consisting of a plurality of openings through the tubular wall which cooperate to form decorative shapes, said open second end and said plurality of openings allowing a free flow of said volatile fragrant liquid into and out of said overtube, said overtube and said decorative openings being visible within said bottle;
        a first continuous portion beginning at the first end and extending to the second end bisecting no decorations; and
        a second continuous portion beginning at the first end and extending to the second end bisecting no decorations; and
    a decorative collar disposed around the pump engine, attachment collar, a first end of the dip tube, the overtube adapter, and the first end of the overtube, wherein the decorative collar includes decorations consisting of a plurality of additional openings which cooperate to form a second set of decorative shapes.

5. A fine mist spray pump having a dip tube, comprising:
    an overtube adapter having a flange extending outward from an end of the overtube adapter;
    an overtube comprising,
        a first end;
        a second end;
        a tubular wall between the first end and the second end, wherein the first end is received with the overtube adapter creating a closed first end around the dip tube, and the second end is free floating relative to the dip tube creating an open second end;
        decorations in the overtube consisting of a plurality of openings through the tubular wall which cooperate to form decorative shapes, said open second end and said plurality of openings allowing a free flow of a volatile fragrant liquid into and out of said overtube;

a first continuous portion beginning at the first end and extending to the second end bisecting no decorations; and a second continuous portion beginning at the first end and extending to the second end bisecting no decorations, and a decorative collar disposed around the pump engine, attachment collar, a first end of the dip tube, the overtube adapter, and the first end of the overtube, wherein the decorative collar includes decorations consisting of a plurality of additional openings which cooperate to form a second set of decorative shapes.

6. The pump of claim 5, wherein the overtube adapter comprises an overtube attachment feature adjacent one end of the overtube adapter.

7. The pump of claim 5, wherein the overtube adapter comprises at least one rib adjacent one end of the overtube adapter and the overtube comprises at least one channel configured to mate with the at least one rib to retain the overtube on the overtube adapter.

8. The fragrance product dispensing system of claim 1, wherein the openings in the overtube create a decorative pattern that extends along a majority of the length over the overtube.

9. The improved fragrance product dispensing system of claim 4, wherein the openings in the overtube create a decorative pattern that extends along a majority of the length over the overtube.

* * * * *